United States Patent
Miller et al.

(10) Patent No.: US 6,734,656 B2
(45) Date of Patent: May 11, 2004

(54) BUCK REGULATOR WITH MONOLITHIC N-CHANNEL UPPER FET AND PILOT CURRENT SENSING

(75) Inventors: Greg J. Miller, Apex, NC (US); Michael M. Walters, Apex, NC (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 10/316,136

(22) Filed: Dec. 10, 2002

(65) Prior Publication Data

US 2003/0111983 A1 Jun. 19, 2003

Related U.S. Application Data

(60) Provisional application No. 60/338,923, filed on Dec. 10, 2001.

(51) Int. Cl.[7] .................................................. G05F 1/40
(52) U.S. Cl. ....................................... 323/284; 327/566
(58) Field of Search ................................. 323/284, 282, 323/285, 224; 327/564, 565, 566

(56) References Cited

U.S. PATENT DOCUMENTS

| 5,627,460 A | * | 5/1997 | Bazinet et al. ............... 323/288 |
| 5,805,433 A | | 9/1998 | Wood ............................ 363/16 |
| 5,870,296 A | | 2/1999 | Schaffer ....................... 363/65 |
| 6,522,115 B1 | * | 2/2003 | Greitschus ................... 323/288 |

* cited by examiner

*Primary Examiner*—Shawn Riley
(74) *Attorney, Agent, or Firm*—Allen, Dyer, Doppelt, Milbrath & Gilchrist, P.A.

(57) ABSTRACT

A power switching stage architecture for a buck topology-based, DC—DC converter includes an upper power switching N-channel device FET integrated in the same semiconductor circuit chip with the switching driver, while a lower power switching is also an N-channel FET, but is external to the driver chip. Either of the two power switching FETs may be configured to include a pilot FET cell, to facilitate current sensing for the controller.

9 Claims, 3 Drawing Sheets

BUCK REGULATOR WITH MONOLITHIC N-CHANNEL UPPER FET AND PILOT CURRENT SENSING

CROSS-REFERENCE TO RELATED APPLICATION

The present application claims the benefit of prior U.S. application Ser. No. 60/338,923, filed Dec. 10, 2001, entitled: "Efficient Buck Topology DC to DC Power Stage Utilizing Monolithic N-Channel Upper FET," by G. Miller et al, assigned to the assignee of the present application and the disclosure of which is incorporated herein.

FIELD OF THE INVENTION

The present invention relates in general to electronic circuits and components therefor, and is particularly directed to a new and improved power switching stage architecture for a buck topology-based, DC—DC converter, which has an upper power switching N-channel device FET integrated in the same semiconductor circuit chip with the switching driver, while the lower power switching is also an N-channel FET, but is external to the driver chip. In addition, either or both of the two power switching FETs may be configured to include a pilot FET cell, to facilitate current sensing for the controller.

BACKGROUND OF THE INVENTION

Electrical power for an integrated circuit (IC) is typically supplied by one or more direct current power sources, such as a buck-mode, pulse width modulation (PWM) based, DC—DC converter of the type diagrammatically shown in FIG. 1. As shown therein, a controller 10 supplies a synchronous PWM signal to a driver 20, for controlling the turn-on and turn-off of a pair of electronic power switching devices, that are external to the driver circuit 20 and to which a powered load 65 is coupled. In the illustrated DC—DC converter, the external electronic power switching devices are depicted as an upper (or high side) power NMOSFET (or NFET) device 30, and a lower (or low side) power NFET device 40, having their drain-source current flow paths connected in series between a pair of power supply rails (e.g., VIN and ground (GND)).

The upper NFET device 30 is turned on and off by an upper gate switching signal UGATE applied to its gate from driver 20, while the lower NFET device 40 is turned on and off by a lower gate switching signal LGATE supplied from driver 20. The gate drive voltage for the upper NFET device 30 may be driven directly from a source voltage higher than the voltage VIN, or may be bootstrapped as shown in FIG. 2. Also, rather than employ an NMOS device for the upper FET a PMOS device may be employed.

A common node 35 between the upper and lower power FETs is coupled through an inductor 50 to a load reservoir capacitor 60 that is coupled to a reference voltage terminal (GND). The connection 55 between inductor 50 and capacitor 60 serves as an output node 55 from which a desired (regulated) DC output voltage VOUT is applied to LOAD 65 (coupled to GND). The output node connection 55 is also fed back to error amplifier circuitry 12 within the controller 10. The error amplifier circuitry is used to regulate the converter's output DC voltage relative to a reference voltage supply. In addition, the common node 35 between the controllably switched NFETs is coupled (by way of a feedback sense resistor 45) to current-sensing circuitry 15 within the controller 10, in response to which the controller adjusts duty ratio of the PWM signal, as necessary, to maintain the converter's DC output within a prescribed set of parameters.

The current trend in DC—DC converters is to operate at relatively high switching frequencies (e.g., on the order of several KHz to one MHz or higher). This serves to reduce the size, and therefore cost and circuit board occupancy of the inductor and capacitor components coupled between the common node and the load. The increase in switching frequency, however, is not without a performance penalty, especially for relatively large voltage step down ratios (e.g., from a 12 VDC supply (as may be supplied from an automobile battery) to an output voltage on the order of 1.2–1.5 VDC). In such a case, the upper power FET (which typically operates a relatively low duty cycle (e.g., on the order of ten to twelve percent)) can introduce significant switching losses, particularly since it is an external device having substantial parasitic impedance. On the other hand, the lower FET operates at a relatively high duty cycle and does not suffer severe switching-based power dissipation.

One proposal to address this problem has been to integrate both the upper and lower FETS into a common integrated circuit chip with the driver, as diagrammatically illustrated in FIG. 4, which shows the both devices as N-channel devices, or as shown in FIG. 5 wherein the upper device is a P-channel device and the lower device is an N-channel device. A drawback to this approach is the considerable cost of manufacture of the resulting integrated circuit chip to accommodate both power switching devices. An alternative proposal, shown in FIG. 6, has been to integrate an upper P-channel device in the same chip as the driver, but leave the lower N-channel FET as an external device.

This approach has the advantage of reducing the switching losses associated with relatively low duty cycle of the upper FET, and also reducing costs of having to integrate both devices in a common circuit chip (and the fact that P channel devices are easier to implement from a gate drive standpoint). It also takes advantage of the fact that the lower NFET device operates at a relatively high duty cycle and its implementation is fairly well standardized.

Now, although the partially integrated approach of FIG. 6 provides an improvement over the fully external or fully integrated approaches of FIGS. 1–5, the use of a P-channel FET as the upper power switching device suffers from a considerably higher on-resistance and large silicon occupancy area.

SUMMARY OF THE INVENTION

In accordance with the present invention, the above shortcomings of conventional power switching stage topologies are substantially reduced by a new and improved architecture, comprised of an upper power switching N-channel device FET integrated in the same semiconductor circuit chip with the driver, while the lower power switching is also an N-channel FET, but is external to the driver chip. In addition, either or both of the two power switching FETs may be configured to include a 'pilot' FET cell, so as to facilitate current sensing for the controller.

DETAILED DESCRIPTION

Figure 7:
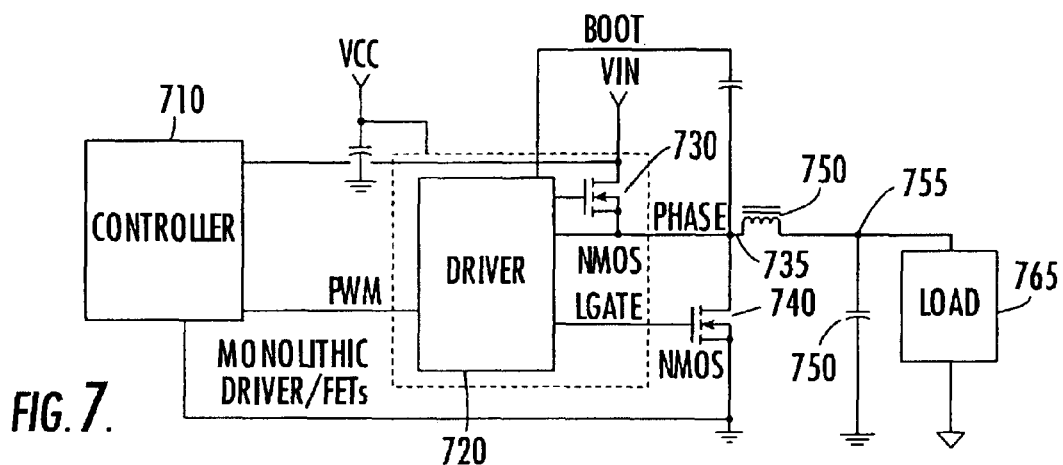
FIG. 7 diagrammatically illustrates a first embodiment of a PWM based, DC—DC converter of the present invention in which an upper power switching NFET is integrated with the driver chip, while the lower power switching NFET is external to the driver chip.

Attention is now directed to FIG. 7, which diagrammatically shows the circuit architecture of a partially integrated N-channel power switching stage for a buck topology-based DC—DC converter, in accordance with the present invention. Like the architecture of FIG. 1, a controller 710 supplies a synchronous PWM signal to a driver 720, which controls the turn-on and turn-off of a pair of electronic power switching devices 730 and 740 to which a powered load 765 is coupled. Unlike the architectures of any of FIGS. 1–6, in the DC—DC converter of FIG. 7, however, the upper (or high side) power NMOSFET 730 is integrated in the same semiconductor chip 700 as is the driver 720. On the other hand, the lower power switching device comprises an N-channel FET 730 that is external to the chip 700. As in the previously described topologies, the upper and lower power NFETs have their drain-source current flow paths connected in series between a pair of power supply rails (shown as VIN and GND).

The upper integrated NFET device 730 is turned on and off by upper gate switching signal UGATE and the lower external NFET device 740 is turned on and off by a lower gate switching signal LGATE supplied from the internal driver 720. Although, in the embodiment of FIG. 7, the gate drive voltage for the upper NFET device 730 is shown as being bootstrapped, in may be driven directly from a source voltage higher than the voltage VIN. A common node 735 between the upper internal NFET 730 and the lower external NFET 740 is coupled through inductor 750 to load reservoir capacitor 760 referenced to GND. The connection 755 between inductor 750 and capacitor 760 serves as an output node 755 from which a regulated DC output voltage VOUT is applied to the LOAD 765 (also referenced to GND). The output node connection 755 is also fed back to error amplifier circuitry 712 within the controller 710. The error amplifier circuitry is used to regulate the converter's output DC voltage relative to a reference voltage supply.

Figure 1:
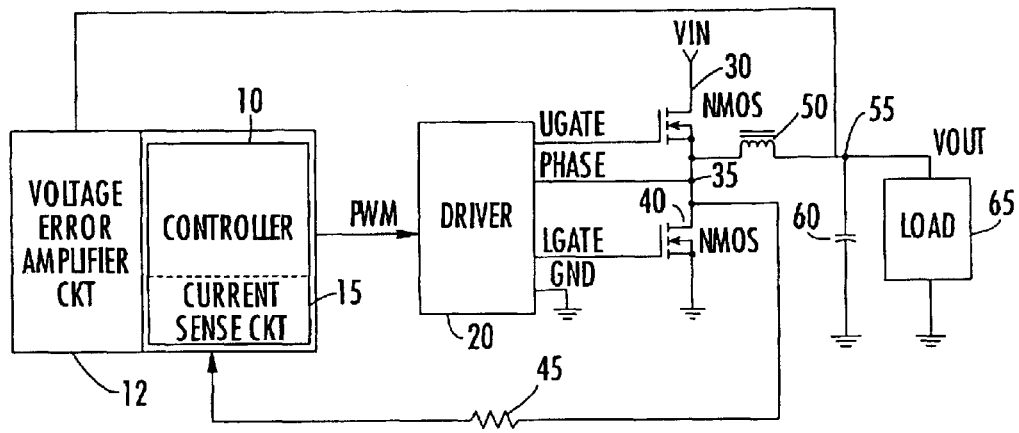
FIG. 1 diagrammatically illustrates a conventional buck-mode, pulse width modulation (PWM) based, DC—DC converter.
Figure 2:
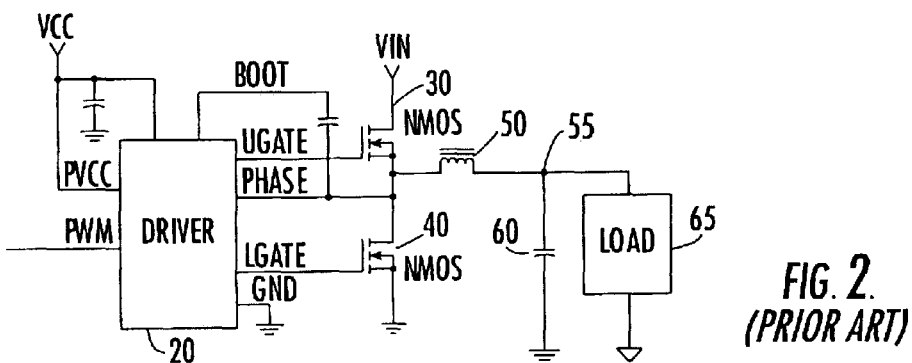
FIG. 2 diagrammatically illustrates the PWM based, DC—DC converter of FIG. 1 with bootstrapped gate drive for the power switching device.
Figure 3:
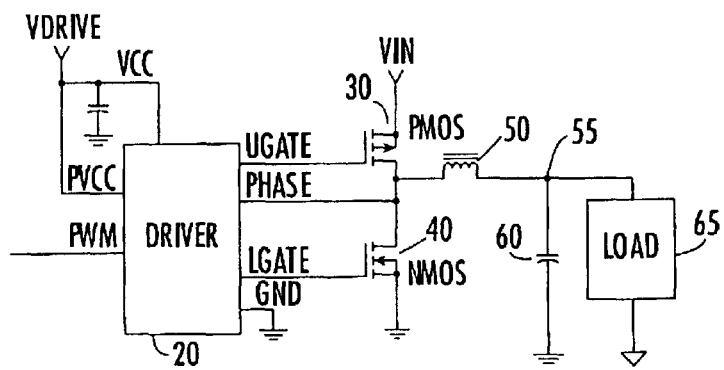
FIG. 3 diagrammatically illustrates a modification of the PWM based, DC—DC converter of FIG. 1 having a P-channel upper switching device.
Figure 4:
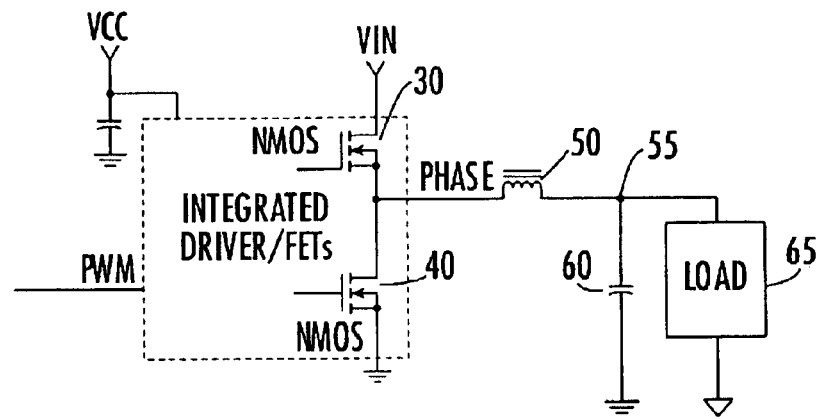
FIG. 4 diagrammatically illustrates a modification of the PWM based, DC—DC converter of FIG. 1 in which both upper and lower power switching devices are integrated in the driver chip.
Figure 5:
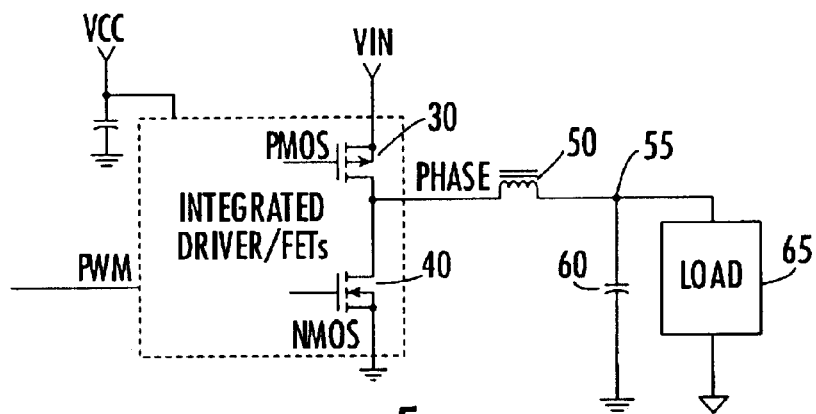
FIG. 5 diagrammatically illustrates a modification of the PWM based, DC—DC converter of FIG. 4 in which the upper power switching device is a P-channel device.
Figure 6:
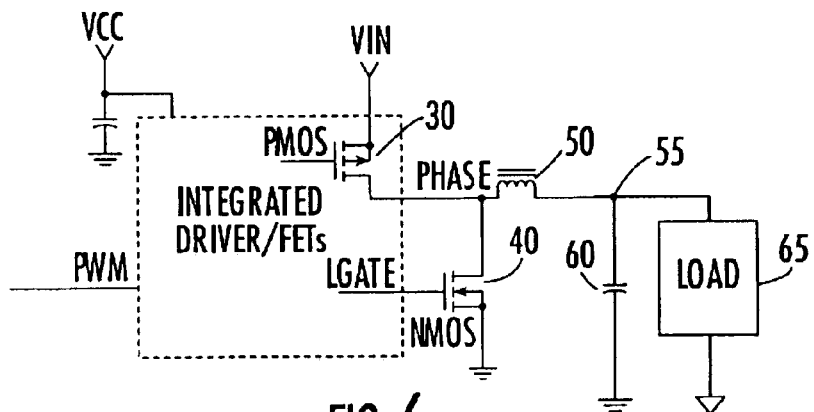
FIG. 6 diagrammatically illustrates a modification of the PWM based, DC—DC converter of FIG. 5 in which the lower power switching device is external to the driver chip.
Figure 8:
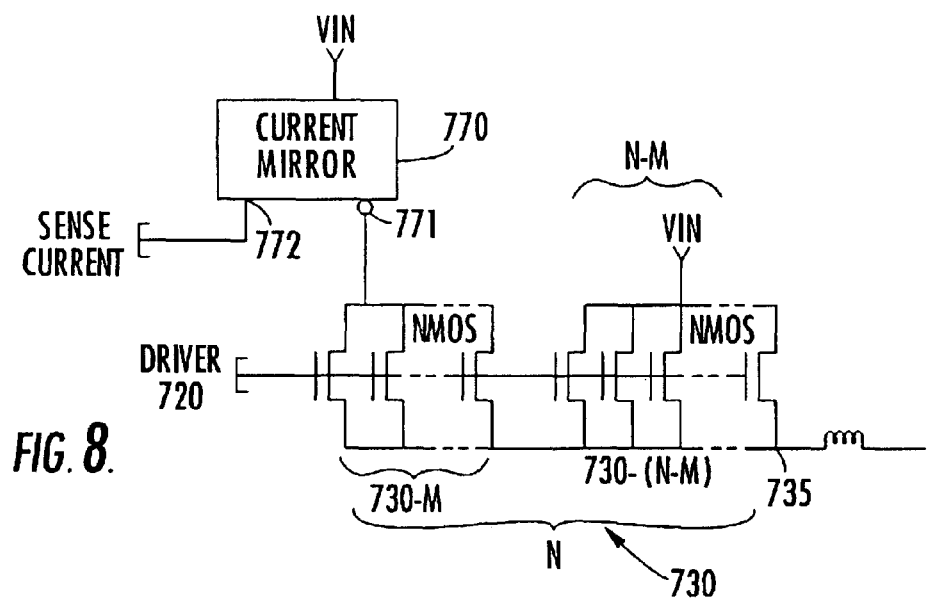
FIG. 8 diagrammatically illustrates a plurality of N NFET cells containing M pilot NFET cells for current sensing in the architecture of FIG. 7.

Although, as in the architecture of FIG. 1, the common node 735 between the switched NFETs may be coupled to current-sensing circuitry within the controller, pursuant to the invention, the upper NFET within the integrated circuit chip 700 is configured to include a 'pilot' NFET for current sensing. To this end, as diagrammatically illustrated in FIG. 8, the upper internal NFET may be configured of a plurality of N NFET cells (which may typically be on the order of hundreds to upwards of hundreds of thousands of NFET cells. Within this commonly integrated NFET cell distribution, a prescribed fraction or plurality of M cells forms as a 'pilot' cell group and is used for current sensing.

For equal geometry parallel-connected NFET cells throughout the N-channel FET 730, the area and therefore the current flowing through the upper internal N-channel FET's M cell group 730-M will be a prescribed fraction of M/(M+N) of the total number of cells of the NFET 730. The collective current flowing through the pilot NFET cell group 730-M is coupled to an input port 771 of a current mirror 770 (which may be integrated in the chip 700, as shown) having an output port 772 that supplies a current representative of the sensed current, which is supplied to the controller 710.

Figure 9:
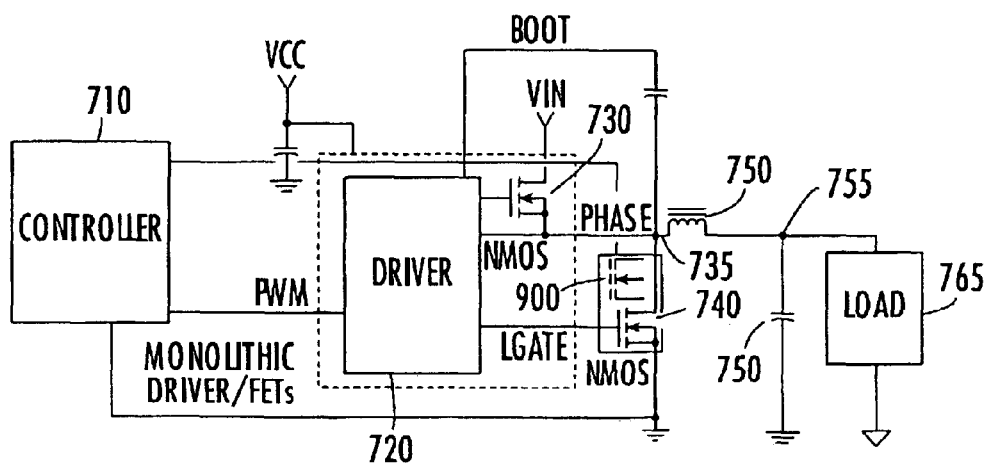
FIG. 9 diagrammatically illustrates the embodiment of FIG. 7 with pilot NFET cells included in the external lower NFET.

In an alternative embodiment, diagrammatically shown in FIG. 9, current sensing may be carried out by means of a 'pilot' array 900 within the multi-cell NFET that forms the external lower N-channel FET. The architecture is essentially the same as that of FIG. 8, except that the pilot NFET being common with NFET 740 is external to the integrated circuit chip 700 containing the driver 729 and the upper N-channel NFET 730.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. In an apparatus for generating a regulated direct current (DC) output voltage, said apparatus including a buck topology-based, DC—DC converter coupled to a supply voltage, and being operative to generate a regulated output voltage derived from said supply voltage, said DC—DC converter having a pulse width modulation (PWM) generator which generates a PWM switching signal for application to a switching circuit driver, that switchably controls operation of a switching circuit containing upper and lower power switching NFET devices coupled between respective first and second power supply terminals, a common node thereof being coupled through an inductor element to an output voltage terminal, and a controller for controlling the operation of said PWM generator, the improvement wherein said upper power switching NFET device is formed in a common integrated circuit with said switching circuit driver, and said lower power switching NFET device is external to said common integrated circuit.

2. The improvement according to claim 1, wherein said upper power switching NFET device includes a pilot NFET cell array that produces a sense current in accordance with current flow through said upper power switching NFET device, said sense current being coupled to said controller for adjusting the duty cycle of said PWM signal to maintain said DC—DC converter's output within a prescribed set of parameters.

3. The improvement according to claim 1, wherein said lower power switching NFET device includes a pilot NFET cell array that produces a sense current in accordance with current flow through said lower power switching NFET device, said sense current being coupled to said controller for adjusting the duty cycle of said PWM signal to maintain said DC—DC converter's output within a prescribed set of parameters.

4. A method of configuring a buck topology-based, DC—DC converter that is operative to generate a regulated output voltage derived from a supply voltage, said method comprising the steps of:

(a) providing a pulse width modulation (PWM) generator which generates a PWM switching signal for application to a switching circuit driver, that switchably controls operation of a switching circuit containing upper and lower power switching NFET devices coupled between respective first and second power supply terminals, a common node thereof being coupled through an inductor element to an output voltage terminal, and a controller for controlling the operation of said PWM generator;

(b) integrating said upper power switching NFET device in a common integrated circuit with said switching circuit driver; and (c) providing said lower power switching NFET device external to said common integrated circuit.

5. The method according to claim 4, wherein step (b) comprises configuring said upper power switching NFET device to include a pilot NFET cell array that produces a sense current in accordance with current flow through said upper power switching NFET device, and coupling said sense current to said controller for adjusting the duty cycle of said PWM signal to maintain said DC—DC converter's output within a prescribed set of parameters.

6. The improvement according to claim 4, wherein step (c) comprises configuring said lower power switching NFET device to include a pilot NFET cell array that produces a sense current in accordance with current flow through said lower power switching NFET device, and coupling said sense current to said controller for adjusting the duty cycle of said PWM signal to maintain said DC—DC converter's output within a prescribed set of parameters.

7. A DC—DC converter for generating a regulated output voltage derived from a supply voltage, comprising:

a pulse width modulation (PWM) generator which generates a PWM switching signal for application to a switching circuit driver, that switchably controls operation of a switching circuit containing upper and lower power switching NFET devices coupled between respective first and second power supply terminals, a common node thereof being coupled through an inductor element to an output voltage terminal; and a controller for controlling the operation of said PWM generator; and wherein said upper power switching NFET device is formed in a common integrated circuit with said switching circuit driver, and said lower power switching NFET device is external to said common integrated circuit.

8. The DC—DC converter according to claim 7, wherein said upper power switching NFET device includes a pilot NFET cell array that produces a sense current in accordance with current flow through said upper power switching NFET device, said sense current being coupled to said controller for adjusting the duty cycle of said PWM signal to maintain said DC—DC converter's output within a prescribed set of parameters.

9. The DC—DC converter according to claim 7, wherein said lower power switching NFET device includes a pilot NFET cell array that produces a sense current in accordance with current flow through said lower power switching NFET device, said sense current being coupled to said controller for adjusting the duty cycle of said PWM signal to maintain said DC—DC converter's output within a prescribed set of parameters.

* * * * *